US012447447B2

(12) United States Patent
Gerl et al.

(10) Patent No.: US 12,447,447 B2
(45) Date of Patent: Oct. 21, 2025

(54) MIXING TOOL FOR DRY MIXING AND COATING

(71) Applicant: Maschinenfabrik Gustav Eirich GmbH & Co. KG, Hardheim (DE)

(72) Inventors: Stefan Gerl, Werbach (DE); Clemens Schmitt, Walldürn-Altheim (DE); Andreas Seiler, Tauberbischofsheim (DE)

(73) Assignee: Maschinenfabrik Gustav Eirich GmbH & Co. KG, Hardheim (DE)

( * ) Notice: Subject to any disclaimer, the term of this patent is extended or adjusted under 35 U.S.C. 154(b) by 707 days.

(21) Appl. No.: 17/780,159

(22) PCT Filed: Nov. 26, 2020

(86) PCT No.: PCT/EP2020/083521
§ 371 (c)(1),
(2) Date: May 26, 2022

(87) PCT Pub. No.: WO2021/105291
PCT Pub. Date: Jun. 3, 2021

(65) Prior Publication Data
US 2022/0410095 A1    Dec. 29, 2022

(30) Foreign Application Priority Data
Nov. 28, 2019  (DE) ............ 10 2019 132 264.2

(51) Int. Cl.
B01F 27/052   (2022.01)
B01F 23/60   (2022.01)
(Continued)

(52) U.S. Cl.
CPC ............ B01F 27/052 (2022.01); B01F 23/60 (2022.01); B01F 27/053 (2022.01);
(Continued)

(58) Field of Classification Search
CPC .... B01F 27/1152; B01F 27/052; B01F 27/93; B01J 2/10; B01J 2/006
See application file for complete search history.

(56) References Cited

U.S. PATENT DOCUMENTS 3,322,401 A   5/1967  Mersch
3,630,636 A   12/1971 Hill
(Continued)

FOREIGN PATENT DOCUMENTS

CN    103391809 A    11/2013
CN    205146327 U    4/2016
(Continued)

OTHER PUBLICATIONS

International Search Report and Written Opinion mailed Feb. 24, 2021 for PCT/EP2020/083521 (with English translation of International Search Report only).
(Continued)

Primary Examiner — Elizabeth Insler
(74) Attorney, Agent, or Firm — MEDLER FERRO WOODHOUSE & MILLS PLLC

(57) ABSTRACT

A tool for dry mixing and coating of powder mixtures includes a fixing shaft and an approximately disc-shaped element fixed thereto and of a diameter d, having an upper surface, a lower surface and a peripheral surface connecting the upper and lower surfaces. The disc-shaped element has a plurality of grooves extending parallel to the shaft axis. Each groove has two groove walls extending from the peripheral surface to a groove bottom. A tooth is formed between two grooves. In order to provide a tool which is suitable for particularly low contamination dry mixing, dry dispersing and coating of powder mixtures, the disc-shaped element has a base portion and at least one wear element fixed to the base portion, wherein at least one portion of each (Continued)

groove wall, that adjoins the peripheral surface, is formed by the wear element.

13 Claims, 4 Drawing Sheets

(51) Int. Cl.
  *B01F 27/053* (2022.01)
  *B01F 27/1152* (2022.01)
  *B01F 29/86* (2022.01)
  *B01J 2/00* (2006.01)
  *B01J 2/10* (2006.01)
(52) U.S. Cl.
  CPC .......... *B01F 27/1152* (2022.01); *B01F 29/86* (2022.01); *B01J 2/006* (2013.01); *B01J 2/10* (2013.01)

(56) References Cited

U.S. PATENT DOCUMENTS

| | | | |
|---|---|---|---|
| 4,153,377 A * | 5/1979 | Been, Jr. ............. | B01F 27/1152 366/317 |
| 5,292,193 A | 3/1994 | Funk | |
| 5,409,313 A | 4/1995 | Funk | |
| 5,620,251 A | 4/1997 | Funder et al. | |
| 5,947,599 A | 9/1999 | Funk | |
| 11,014,055 B2 | 5/2021 | Gerl et al. | |
| 11,298,666 B2 | 4/2022 | Pyo et al. | |
| 2004/0234677 A1 * | 11/2004 | Sato ...................... | H01M 4/525 366/279 |
| 2009/0159732 A1 | 6/2009 | Zollig | |
| 2014/0003189 A1 * | 1/2014 | Gerl ...................... | B01F 27/115 366/343 |
| 2020/0099048 A1 | 3/2020 | Kim et al. | |
| 2021/0213403 A1 * | 7/2021 | Pyo ...................... | B01F 27/0721 |

FOREIGN PATENT DOCUMENTS

| | | |
|---|---|---|
| CN | 109499720 A | 3/2019 |
| CN | 212595056 U | 2/2021 |
| DE | 202008006745 U1 | 7/2008 |
| DE | 102011005519 A1 | 9/2012 |
| EP | 3560607 A1 | 10/2019 |
| FR | 2229464 A1 | 12/1974 |
| KR | 10-2018-0131635 A | 12/2018 |
| KR | 10-1981131 B1 | 5/2019 |
| RU | 2577360 C2 | 3/2016 |
| WO | WO-2012/123441 A1 | 9/2012 |

OTHER PUBLICATIONS

Search Report dated Nov. 28, 2019 for DE 10 2019 132 264.2.

* cited by examiner

MIXING TOOL FOR DRY MIXING AND COATING

CROSS REFERENCE TO RELATED APPLICATIONS

This application is a National Stage of International Application No. PCT/EP2020/083521 filed Nov. 26, 2020, which claims benefit of German Patent Application No. 10 2019 132 264.2 filed Nov. 28, 2019, each of which are herein incorporated by reference in their entirety.

TECHNICAL FIELD

The present invention concerns a tool for dry mixing and coating powder mixtures. In a dry mixing operation a number of dry materials which are frequently in powder form are mixed together. In a coating operation coarser powder particles can be encased by dry mixing with simultaneous deposit of markedly finer particles on the surface of the coarser particles. Alternatively or in combination with the fine particles liquids can be applied in very small amounts to the coarser powder, and they wet the particle surface as completely as possible.

BACKGROUND

WO 2012/123441 A1 discloses whirler tools for intensive mixers for the microgranulation of moist solids mixtures which have a fixing shaft and an approximately disc-shaped element fixed thereto, of a diameter d, having an upper surface, a lower surface and a peripheral surface connecting the upper and lower surfaces, wherein the peripheral surface has a plurality of grooves extending parallel to the shaft axis, wherein each groove has two groove walls extending from the peripheral surface to a groove bottom so that a respective tooth is formed between two adjacent grooves.

The term peripheral surface is to be interpreted here as meaning that the groove walls and the groove bottom are not part of the peripheral surface. The peripheral surface is therefore interrupted by the grooves provided therein. If the disc-shaped element is exactly circular the peripheral surface is on the perimeter of the disc-shaped element.

In the known whirler tool the direction of rotation of the tool is fixed. Therefore the groove wall which leads in the direction of rotation is provided with a carbide element to reduce wear of the tool, in particular at the radially outer end.

In the microgranulation of moist solids mixtures abrasive wear at the tool is admittedly not wanted as that leads to a deterioration in the outcome, but abrasive wear inevitably occurs at the groove wall which is not provided with a carbide element. That slight abrasive wear drops into the material being mixed and is evidently mixed into the product, which however does not represent any problem in the usual situations of use.

The known tool is therefore in principle not suitable for the dry mixing and coating of powder mixtures, in particular if that is to be effected with as little iron as possible, as by virtue of the structure involved it is not possible to prevent abrasive wear from the tool which is made of iron from passing into the material being mixed, which however is imperatively to be avoided in contamination-free dry mixing. Thus for example in the production of cathode material for energy storage systems any contamination of the material being mixed, for example by virtue of abrasion from the tool, is to be avoided.

U.S. Pat. No. 5,409,313 A1 also discloses an apparatus for deagglomerating powder in a mixture of liquid and powder. That apparatus includes a mixing container, a stirring disc arranged in the mixing container and a deflection plate. The disc contains a multiplicity of assembled teeth mounted radially and removably at the periphery thereof. Each of the composite teeth comprises a substrate to which a front plate is fixed, that preferably comprises a ceramic material like tungsten carbide.

Therefore the object of the present invention is to provide a tool which is suitable for in particular low-contamination dry mixing, dry dispersing and coating of powder mixtures.

SUMMARY

According to the invention that is attained in that that the disc-shaped element has a base portion and at least one wear element fixed to the base portion, wherein at least one portion of each groove wall, that adjoins the peripheral surface, is formed by the at least one wear element, wherein the lower surface has at least one whirling-up element which projects beyond the lower surface, wherein the whirling-up element is arranged closer to the fixing shaft than the groove bottom.

According to the invention therefore not only the groove wall which is oriented in the direction of rotation is covered with a wear element, but also the oppositely disposed groove wall and at best also the peripheral surface at the radially outer end of the teeth. Tests have shown that the abrasive wear occurs predominantly in the portions of the groove wall, that adjoin the peripheral surface.

The use of wear elements on both groove walls makes it possible to markedly reduce wear and abrasion while low-contamination operation becomes possible.

Basically it is also possible for the complete tooth or even a group of teeth to be in the form of a wear element. It is also possible for each tooth to be fitted with a wear-resistant cap which encases the tooth.

In all those cases a portion of each groove wall, that adjoins the peripheral surface, is formed by the at least one wear element. Therefore a plurality of wear elements can be provided in a groove, those elements forming at least portions of oppositely disposed groove walls, or entire groups of teeth or also only individual teeth can be in the form of a wear element. At any event however this ensures that at least one portion of each groove wall, that adjoins the peripheral surface, comprises a wear-resistant material.

The term wear-resistant material is used to denote any material which has an increased resistance to wear, in comparison with the material of the base body.

The structure according to the invention also has the advantage that the direction of rotation of the tool can still be changed during operation in order to achieve operation with the lowest possible levels of raised dust turbulence.

Preferably the wear element comprises carbide. It is however also possible to advantageously use other wear-resistant non-ferrous materials, like for example a ceramic.

A further preferred embodiment provides that both groove walls and preferably also the groove bottom is formed by the at least one wear element. In other words, not only the portion of the groove wall, that adjoins the peripheral surface, is fitted with or formed by a wear element, but the entire groove wall and preferably also the groove bottom. Furthermore the peripheral surface between two grooves could also be fitted with or formed by a wear element. In that way the abrasive wear can be further reduced.

In a preferred embodiment the wear element is of a multi-part configuration.

It has been found that the groove bottom is of a groove bottom length which extends from the first groove wall to the second groove wall and which is at least 10%, preferably at least 25%, of the groove wall length from the groove bottom to the peripheral surface.

In addition at least 20% and preferably at least 50% of the groove wall length should be formed by the at least one wear element.

The V-shaped grooves disclosed in above-mentioned WO 2012/123441 suffer from the disadvantage in dry mixing that under some circumstances constituents of the material being mixed, in particular in the case of cohesive raw materials, collect in the proximity of the groove bottom and no longer participate in the mixing operation. The described configuration of the groove bottom means that the groove is markedly larger in particular in the region of the groove bottom so that the risk of constituents of the material being mixed becoming clogged in the groove bottom is markedly reduced.

The grooves should not be excessively small in order to ensure effective thorough mixing.

In a further preferred embodiment the groove wall is of a groove wall length extending from the peripheral surface to the groove bottom, which is between 0.05 and 0.4 times, preferably between 0.1 and 0.3 times, and best between 0.15 and 0.25 times the diameter d of the disc-shaped element.

According to the invention it is provided that the lower surface has at least one whirling-up element which projects beyond the lower surface, wherein preferably there are provided a plurality of whirling-up elements which particularly preferably are at angular spacings which are equal in the peripheral direction.

The material being mixed which passes under the disc is urged outwardly and upwardly by the whirling-up elements so that the material can flow upwardly in the grooves. This therefore prevents constituents of the material being mixed being deposited at the bottom of the container in which the tool is used and no longer participating in the mixing operation. The whirling-up element preferably comprises a wear-resistant material like for example carbide or ceramic. The whirling-up element could also comprise a hardened metal, like for example hardened steel.

It has been found that there should be at least four whirling-up elements in order to provide for effective thorough mixing. Best there are provided even ten or more whirling-up elements.

A further preferred embodiment provides that at least one whirling-up element can be reciprocated between two positions, wherein the whirling-up element projects beyond the lower surface less in the first position than in the second position.

In that case the whirling-up element can be fixed at least in the second position in such a way that, in operation of the tool, no unintentional movement of the whirling-up element between the first and second positions takes place. For example the whirling-up element can be adjustable in length so that a movement between the first and second positions is effected by a variation in the length.

As an alternative thereto the length with which the whirling-up element projects in the axial direction beyond the lower surface of the disc-shaped element can also be implemented by the whirling-up element being screwed to the disc-shaped element and by one or more support shims being arranged between the whirling-up element and the disc-shaped element for varying that length.

By virtue of that measure it is possible for the whirling-up element to be arranged as closely as possible to the surface of the container in which the tool is arranged. In general it is desirable if at least one whirling-up element and preferably two whirling-up elements are arranged as closely as possible to the container bottom in order to free it of adhering material. Preferably the spacing between the lower edge of the whirling-up element and the upper edge of the container bottom is only a few $\frac{1}{10}$th of a millimeter to a few millimeters and indeed best between 0.2 mm and 5 mm. The remaining whirling-up elements can then be at a substantially greater spacing relative to the surface of the container bottom.

It may however be necessary for the entire tool to be moved in the axial direction in the direction of the bottom in order to separate the tool from a corresponding drive or a flange with a centring action. That is also possible by the measure according to the invention as then the whirling-up elements can be moved from the second position into the first position so that a greater spacing remains between the whirling-up elements and the container bottom and the entire tool can be moved axially for disconnection from the drive.

That can also be implemented by the whirling-up element having a threaded bore into which engages a screw which engages through a through bore in the disc-shaped element in order to fix the whirling-up element. If the tool is to be moved axially in the direction of the container bottom then the axially further projecting whirling-up elements have to be released from the disc-shaped element and removed in the radial direction.

In a preferred embodiment the whirling-up element is also formed by the wear element. For example a wear element could comprise a group of teeth and a whirling-up element which is integrally formed, for example soldered in place.

It has been found that that the whirling-up element is arranged as closer as possible to the fixing shaft than the groove bottom, wherein preferably the spacing between the fixing shaft and the whirling-up element is >50%, preferably >75% and best between 80 and 98% of the spacing between the groove bottom and the fixing shaft.

The present invention also concerns an apparatus for dry mixing or coating of powder mixtures comprising a container and a tool according to the invention arranged therein.

In that case it is preferred that the container is rotatable about a container axis spaced from the fixing shaft axis, wherein preferably the diameter d of the disc-shaped element is between 30 and 70% of the container diameter.

A further preferred embodiment provides that the tool is positioned within the container in such a way that the shortest spacing between the peripheral surface of the tool and the container wall is less than 10% of the container diameter.

BRIEF DESCRIPTION OF THE FIGURES

Further advantages, features and possible uses will be apparent from the description hereinafter of a preferred embodiment and the accompanying Figures in which.

DETAILED DESCRIPTION OF PARTICULAR EMBODIMENTS

The tool 1 according to the invention has a fixing shaft 2 having a flange 3. The tool can be fixed to a drive (not shown) by way of the flange 3 and rotated about the axis of the fixing shaft 2.

Arranged at the end of the tool 1, that is remote from the flange 3, is a disc-shaped element 4, the disc axis of which coincides with the axis of the fixing shaft 2.

Figure 1:
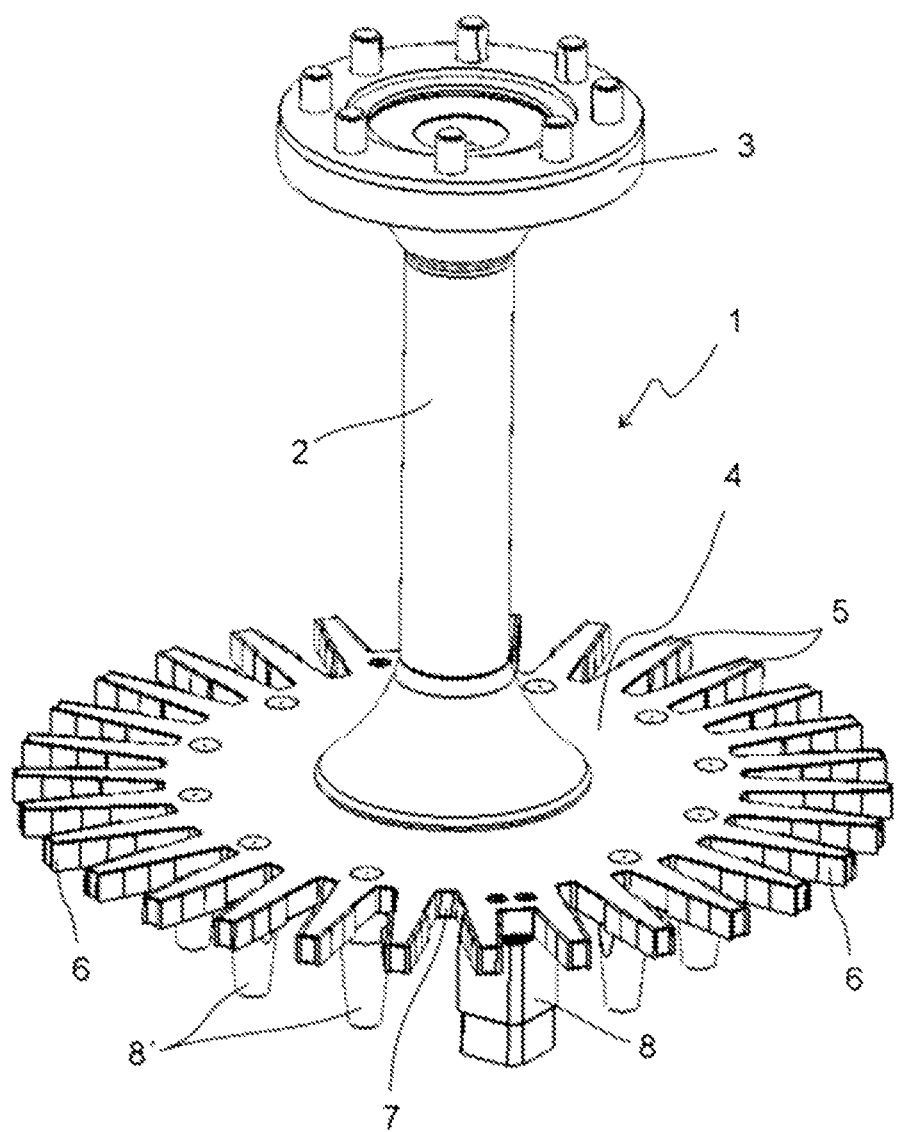
FIG. 1 shows a perspective view of a first embodiment of the invention.

The disc-shaped element has an upper surface which can be seen in FIG. 1, a lower surface which cannot be seen in FIG. 1, and a peripheral surface connecting the upper and lower surfaces. It will be seen that the disc-shaped element has a plurality of teeth 5 formed by grooves extending parallel to the shaft axis. By virtue of the grooves being formed in the disc-shaped element the teeth 5 remain between the grooves. In the illustrated embodiment both groove walls are covered with a wear element 6 comprising carbide. Three portions of the wear element 6 are fitted to each groove wall in the illustrated embodiment. In this case the radially outer wear element portions are arranged at the portion of the groove wall, that adjoins the peripheral surface. All further wear elements on a groove wall, preferably directly towards the groove bottom, adjoin the radially further outwardly positioned wear element portion. In this embodiment the groove bottom 7 is not fitted with the wear element.

It is however certainly possible for the complete groove walls and the groove bottom but also the peripheral surface between two grooves to be covered with the wear element or with a plurality of wear elements to reduce abrasive wear. In a preferred embodiment all other parts of the mixing tool which can come into contact with the material being mixed like for example the fixing shaft and the disc-shaped element are protected from wear by the application of a wear-resistant layer. The layer can be produced by for example surface hardening or however by means of a coating. The coating in that case can comprise a plastic like for example polyurethane or however a surface hardening. Particularly preferred is a spray coating with which a coating of ceramic or a carbide is produced. The layer thickness of the spray coating should be preferably at least 0.1 mm and particularly preferably more than 0.4 mm. In addition it is advantageous if the surface roughness of the coating is so selected that a layer of the product, which is a few particle layers thick, adheres, which protects the tool from abrasion and thus wear.

Arranged at the lower surface of the disc-shaped element are whirling-up elements 8 and 8' which project beyond the lower surface. In the illustrated embodiment a whirling-up element 8 is adjustable in height, that is to say it is so adapted that it can be reciprocated between two positions or can be adjusted in its length, in which case the whirling-up element 8 in the first position projects beyond the lower surface less than in the second position.

Figure 2:
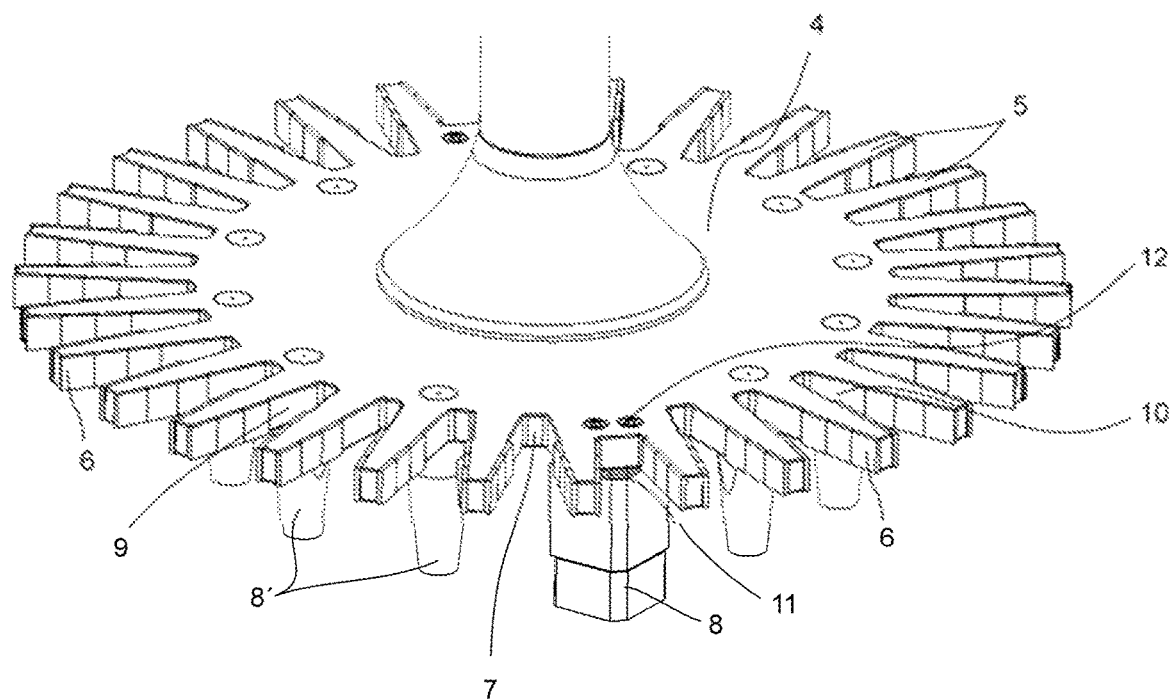
FIG. 2 shows a portion of the first embodiment of the invention.

FIG. 2 shows a close view of the disc-shaped element with whirling-up elements as shown in FIG. 1. The whirling-up element 8 is fixed to the disc-shaped element 4 by way of a releasable screw connection 12. In order to be able to set the spacing relative to the container bottom as small as possible and to be able to compensate for manufacturing tolerances one or more support shims 11 are fitted between the whirling-up element 8 and the disc-shaped element 4. The manufacturing tolerances are very small so that it is possible to completely dispense with the shims.

Figure 3:
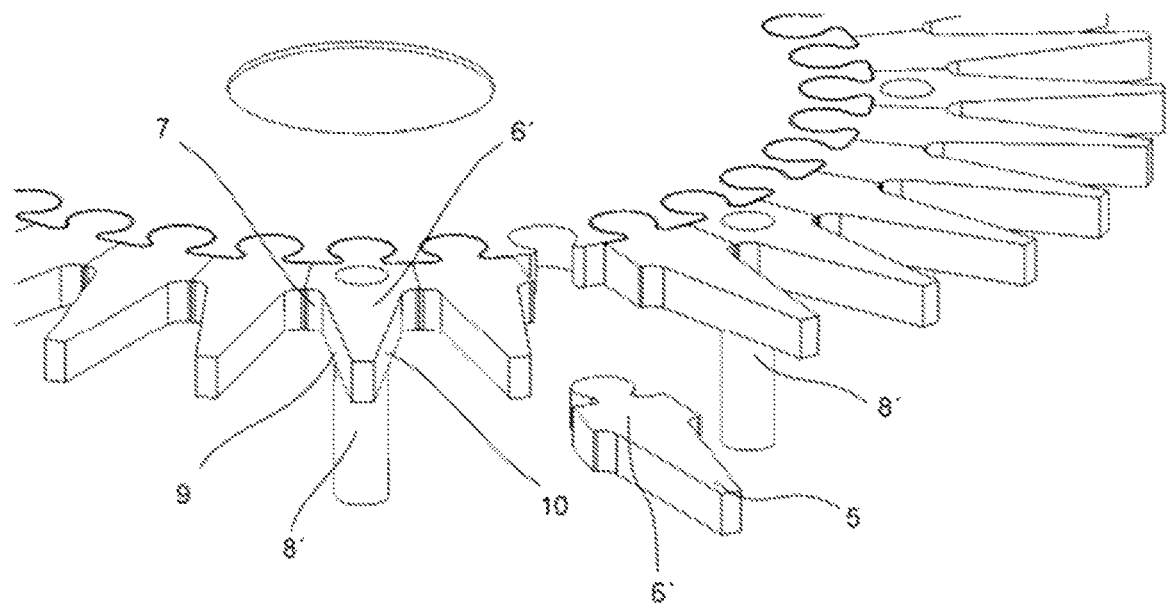
FIG. 3 shows a perspective view of a portion of a second embodiment of the invention.
Figure 4:
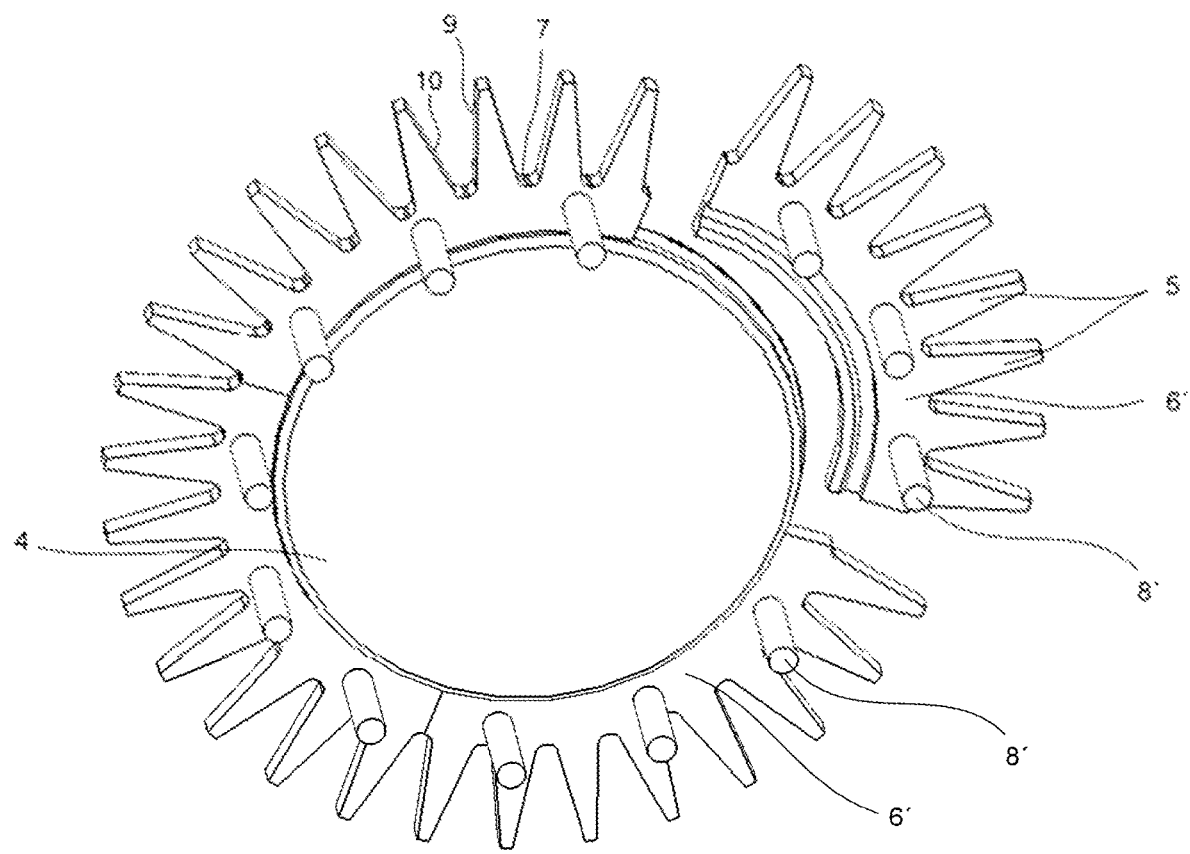
FIG. 4 shows a perspective view of a third embodiment of the invention.
Figure 5:
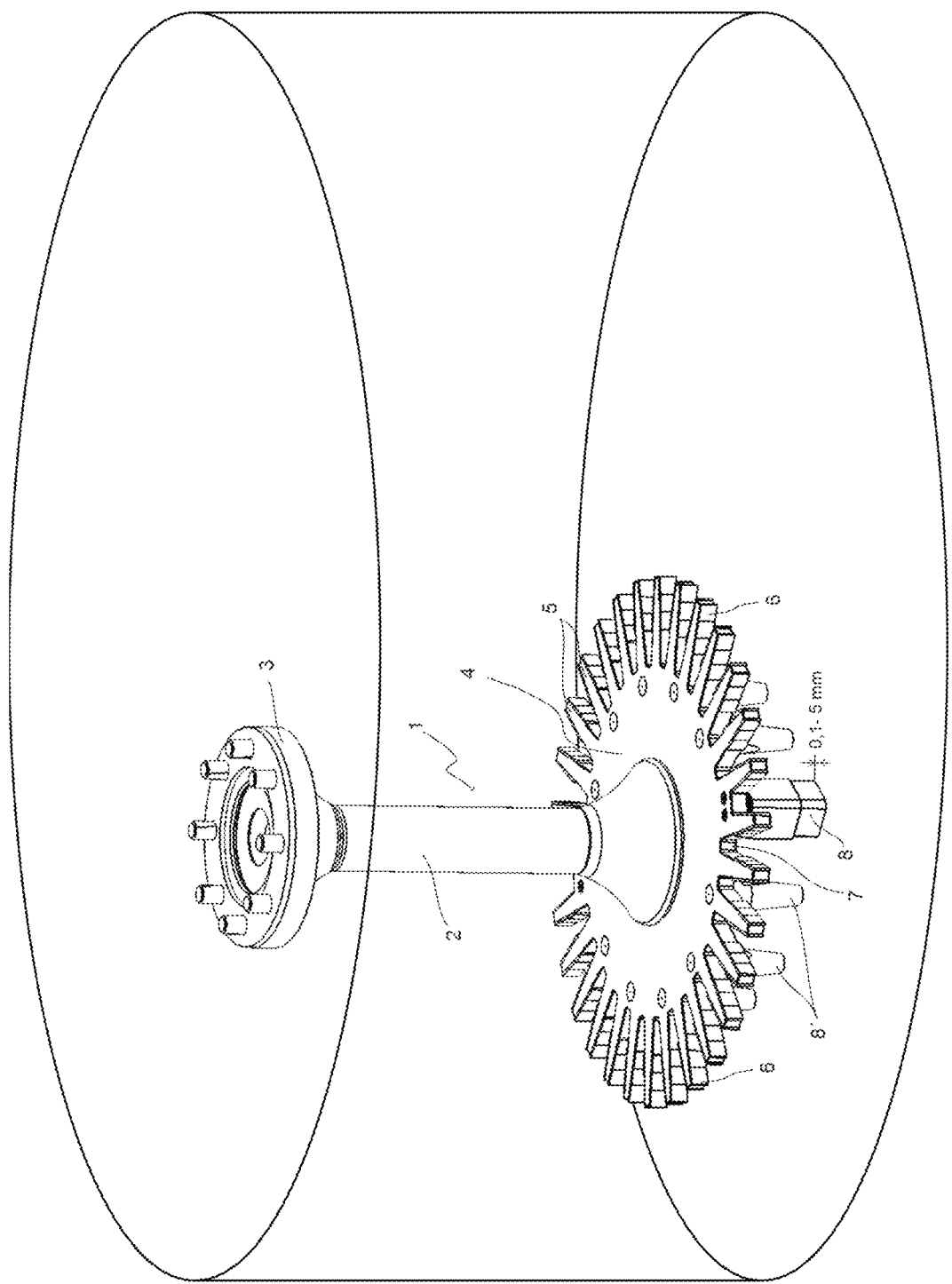
FIG. 5 shows a perspective view of a container within which the tool of the first embodiment of the invention is present.

FIGS. 3 and 4 show views of two further embodiments of the invention. FIG. 3 shows a perspective view of the tool from above while FIG. 4 shows a view of the tool from below.

As far as possible the same references are used for the same components as in FIG. 1. The tool in FIG. 3 and FIG. 4 differs from the embodiment of FIG. 1 on the one hand by the whirling-up elements 8' which in this embodiment are not adjustable in height and by the configuration of the wear element portions 6'.

FIG. 3 shows a variant of the invention in which the wear element 6' comprises individual teeth which for example are made completely from a ceramic. The wear elements 6' are hung in positively locking relationship in corresponding recesses in the base plate by way of a protrusion at an end of the wear element so that the wear elements cannot move in the radial direction. A vertical movement of the wear element in the recess can be prevented for example by a circular or annular cover plate on the top side and the underside of the base plate, which partially or completely covers over the recess. The end of the wear element, that is opposite to the protrusion, is the tooth 5 with the groove walls 9 and 10 and the groove bottom 7. The whirling-up elements 8' can be fixed to the wear elements 6'.

As can be seen in particular from FIG. 4 the wear element here comprises a plurality of wear element portions 6' which in turn respectively form seven teeth 5 of the tool. In other words in this embodiment not just the groove bottom 7 and the groove walls 9, 10 are fitted with a wear element, for example of carbide, but the complete tooth, that is to say the entire wear element portion 6' is here made from for example carbide. FIG. 4 shows the lower surface of the substantially disc-shaped element. It can also be seen that the whirling-up elements 8' are fixed to the wear element portions 6'.

LIST OF REFERENCES

1 tool
2 fixing shaft
3 flange
4 disc-shaped element
5 teeth
6, 6' wear element
7 groove bottom
8, 8' whirling-up elements
9 groove wall
10 groove wall
11 shim
12 screw connection

The invention claimed is:

1. A tool for dry mixing and coating of powder mixtures, comprising:
   a fixing shaft having a fixing shaft axis; and
   an approximately disc-shaped element fixed to the fixing shaft, the disc-shaped element having a diameter d, an upper surface, a lower surface and a peripheral surface connecting the upper and lower surfaces,
   wherein the disc-shaped element has a plurality of grooves extending parallel to the fixing shaft axis,
   wherein each groove has two groove walls extending a length from the peripheral surface to a groove bottom,
   wherein a tooth is formed between two grooves,
   wherein the disc-shaped element is formed of a base body and at least one wear element fixed to the base body, wherein at least one portion of each groove wall, that adjoins the peripheral surface, includes the at least one wear element fitted to the base body, wherein the lower surface has a whirling-up element which projects beyond the lower surface, wherein the whirling-up element is arranged on the disc-shaped element closer to the fixing shaft axis than the groove bottom is to the fixing shaft axis, wherein the whirling-up element is adjustable in length to be reciprocated between two positions, and wherein the whirling-up element projects beyond the lower surface less in the first position than in the second position.

2. The tool according to claim 1, wherein the at least one wear element comprises carbide or another wear-resistant non-ferrous material.

3. The tool according to claim 1, wherein both groove walls and optionally also the groove bottom include the at least one wear element.

4. The tool according to claim 1, wherein the at least one wear element is of a multi-part configuration.

5. The tool according to claim 1, wherein the groove bottom has a groove bottom length which extends from the first groove wall to the second groove wall and which is at least 10% of the groove wall length from the groove bottom to the peripheral surface.

6. The tool according to claim 1, wherein the groove wall length extends from the peripheral surface to the groove bottom between 0.05 and 0.4 times the diameter d.

7. The tool according to claim 1, wherein there are provided a plurality of whirling-up elements which are at angular spacings which are equal in the peripheral direction.

8. The tool according to claim 1, wherein the whirling-up element includes wear-resistant material.

9. The tool according to claim 1, wherein the spacing between the fixing shaft and the whirling-up element is >50% of the spacing between the groove bottom and the fixing shaft.

10. An apparatus for dry mixing or coating of powder mixtures, comprising:
a container having a bottom and a wall; and
a tool comprising:
a fixing shaft; and
an approximately disc-shaped element fixed to the fixing shaft, the disc-shaped element having a diameter d, an upper surface, a lower surface, and a peripheral surface connecting the upper and lower surfaces,
wherein the disc-shaped element has a plurality of grooves extending parallel to a fixing shaft axis, wherein each groove has two groove walls extending from the peripheral surface to a groove bottom,
wherein a tooth is formed between two grooves,
wherein the disc-shaped element is formed of a base body and at least one wear element fixed to the base body,
wherein at least one portion of each groove wall, that adjoins the peripheral surface, includes the at least one wear element fitted to the base body,
wherein the lower surface has a whirling-up element which projects beyond the lower surface,
wherein the whirling-up element is arranged closer to the fixing shaft than the groove bottom is to the fixing shaft axis, and
wherein a spacing between a lower surface of the whirling-up element and an upper surface of the container bottom is between 0.1 mm and 5 mm.

11. The apparatus according to claim 10, wherein the container has a central axis spaced from the fixing shaft axis.

12. The apparatus according to claim 10, wherein the tool is positioned within the container in such a way that the shortest spacing between the peripheral surface of the tool and the container wall is less than 10% of a diameter of the container.

13. The apparatus according to claim 10, wherein the diameter d of the disc-shaped element is between 30 and 70% of a diameter of the container.

\* \* \* \* \*